United States Patent
Hwang et al.

(10) Patent No.: US 11,279,646 B2
(45) Date of Patent: Mar. 22, 2022

(54) METHOD OF MOLDING WINDOW FOR DISPLAY

(71) Applicant: SAMSUNG DISPLAY CO., LTD., Yongin-si (KR)

(72) Inventors: Inborn Hwang, Hwaseong-si (KR); Sangho Park, Hwaseong-si (KR); Jungkyu Lee, Incheon (KR); Jonghyun Choi, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 342 days.

(21) Appl. No.: 16/233,292

(22) Filed: Dec. 27, 2018

(65) Prior Publication Data
US 2019/0248692 A1    Aug. 15, 2019

(30) Foreign Application Priority Data

Feb. 12, 2018    (KR) .......................... 10-2018-0016892

(51) Int. Cl.
*C03B 23/03*    (2006.01)
*C03B 11/12*    (2006.01)

(52) U.S. Cl.
CPC ........ *C03B 23/0307* (2013.01); *C03B 11/122* (2013.01); *C03B 2215/44* (2013.01); *C03B 2215/50* (2013.01)

(58) Field of Classification Search
None
See application file for complete search history.

(56) References Cited

U.S. PATENT DOCUMENTS

| | | | |
|---|---|---|---|
| 2010/0127420 A1* | 5/2010 | Dannoux | ................ C03B 40/02 264/235 |
| 2012/0297828 A1 | 11/2012 | Bailey et al. | |
| 2014/0299300 A1 | 10/2014 | Bailey et al. | |
| 2015/0202854 A1 | 7/2015 | Tsuchiya et al. | |
| 2016/0031752 A1 | 2/2016 | Maschmeyer et al. | |
| 2017/0080632 A1 | 3/2017 | Seo et al. | |
| 2017/0158547 A1 | 6/2017 | Dannoux et al. | |

(Continued)

FOREIGN PATENT DOCUMENTS

| KR | 1020150121101 A | 10/2015 |
|---|---|---|
| KR | 1020170035406 A | 3/2017 |

(Continued)

*Primary Examiner* — Lisa L Herring
(74) *Attorney, Agent, or Firm* — Cantor Colburn LLP

(57) ABSTRACT

A method of molding a window for a display device includes: forming curved side surfaces and curved corners of the window, by pressing a heated preliminary window glass to a mold. The mold includes: a flat portion corresponding to a flat display portion of the display device; a window side surface bending portion corresponding to the side surfaces of the display device; and a window corner bending portion corresponding to the corners of the display device. The forming the curved side surfaces of the window includes pressing the heated preliminary window glass against the window side surface bending portion of the mold; and after the forming of the curved side surfaces, forming the curved corners and a flat portion of the window by further pressing the heated preliminary window glass respectively against the window corner bending portion and the flat portion of the mold.

12 Claims, 11 Drawing Sheets

(56) References Cited

U.S. PATENT DOCUMENTS

2018/0134602 A1    5/2018  Immerman et al.
2019/0202728 A1*   7/2019  Yuan .................. C03B 23/0302

FOREIGN PATENT DOCUMENTS

| KR | 20170045967 A  | * | 4/2017 |
| KR | 1020170090383 A |   | 8/2017 |
| KR | 101893830 B1   | * | 8/2018 |

* cited by examiner

METHOD OF MOLDING WINDOW FOR DISPLAY

This application claims priority to Korean Patent Application No. 10-2018-0016892, filed on Feb. 12, 2018, and all the benefits accruing therefrom under 35 U.S.C. § 119, the disclosure of which is incorporated by reference herein in its entirety.

BACKGROUND

1. Field

The present disclosure relates to a method of molding curved surfaces of a window for a display device, and more specifically to a method which is capable of molding the corners of the window for the display device into the curved surfaces.

2. Description of the Related Art

In viewing a mobile display device, left and right edge portions of the display device have not been utilized as display surfaces. However, the left and right edge portions of a mobile display device formed into curved surfaces has been developed, and such curved surface edge portions are utilized as new display surfaces of the mobile display device.

A left edge, right edge or two-side edge display device can be implemented using a one- or two-curved surface window and a flexible display panel. Additionally, a four-side edge display device using all four side edges as display surfaces is also being developed. Accordingly, a display device in which four-side edges are curved surfaces includes a three-dimensional ("3D") window having four curved side edges.

A window of a curved surface display device is manufactured by thermally molding glass such as by using one or more molds. Glass having an original plate shape is formed such as by molding into a curved surface-shaped product having a curvature by using the viscoelasticity of glass.

SUMMARY

The present disclosure is directed to a method of molding the corners of a window for a display device into curved surfaces from an original non-curved form of the glass.

According to an exemplary embodiment, there is provided a mold for molding a window for a display, the mold including: a flat portion corresponding to a flat display portion of the display device; a window side surface bending portion corresponding to a side surface of the display device which is extended from an edge of the flat display portion thereof; and a window corner bending portion corresponding to a corner of the display device which is extended from a corner of the flat display portion thereof, where along a thickness direction of the mold, the window side surface bending portion disposes the window corner bending portion between the flat portion and the window side surface bending portion.

The window side surface bending portion may include an inclined surface along which an end portion of a preliminary window material which is flat is pressed to be inclined at a first angle relative to a lower surface of the mold.

Contact of the inclined end portion of the preliminary window material along the window corner bending portion between the flat portion and the window side surface bending portion, may bend the inclined end portion to be curved at a second angle relative to the lower surface of the mold, the second angle being smaller than the first angle.

The mold may include a plurality of partial molds each including the flat portion, the window side surface bending portion and the window corner bending portion.

According to another exemplary embodiment, there is provided a mold for molding a window for a display, the mold including at least one mold of an upper mold and a lower mold, where the at least one mold includes: a flat portion corresponding to a flat display portion of the display device; a window side surface bending portion corresponding to a side surface of the display device which is extended from an edge of the flat display portion thereof; and a window corner bending portion corresponding to a corner of the display device which is extended from a corner of the flat display portion thereof, where along a thickness direction of the mold, the window side surface bending portion disposes the window corner bending portion between the flat portion and the window side surface bending portion.

The window side surface bending portion may include an inclined surface along which an end portion of the preliminary window material which is flat is pressed to be inclined at a first angle relative to a lower surface of the mold.

Contact of the inclined end portion of the preliminary window material along the window corner bending portion between the flat portion and the window side surface bending portion, may bend the inclined end portion to be curved at a second angle relative to the lower surface of the mold, the second angle being smaller than the first angle.

The mold may include a plurality of partial molds each including the flat portion, the window side surface bending portion and the window corner bending portion.

According to still another exemplary embodiment, there is provided a method of molding a window for a display, the method including: forming curved side surfaces and curved corners of the window which respectively correspond to side surfaces and corners of the display device, by pressing a preliminary window glass heated to a transition point temperature or higher to at least one mold of an upper mold and a lower mold, where the at least one mold includes: a flat portion corresponding to a flat display portion of the display device; a window side surface bending portion corresponding to the side surfaces of the display device which are respectively extended from edges of the flat display portion thereof; and a window corner bending portion corresponding to the corners of the display device which are respectively extended curved from corners of the flat display portion thereof; the forming the curved side surfaces of the window includes pressing the heated preliminary window glass against the window side surface bending portion of the mold; and after the forming of the curved side surfaces, forming the curved corners and a flat portion of the window by further pressing the heated preliminary window glass respectively against the window corner bending portion and the flat portion of the mold.

The window side surface bending portion may include an inclined surface, and the pressing of the heated preliminary window glass against the window side surface bending portion may press an end portion of the heated preliminary window glass against the inclined surface to bend the end portion at a first angle relative to a lower surface of the mold.

The further pressing of the heated preliminary glass again the window corner bending portion may include contacting the bent end portion of the heated preliminary glass along the window corner bending portion to further bend the end portion to be curved at a second angle relative to the lower surface of the mold, the second angle being smaller than the first angle.

The mold may include a plurality of partial molds each including the flat portion, the window side surface bending portion and the window corner bending portion.

BRIEF DESCRIPTION OF THE DRAWINGS

A more complete appreciation of the invention will become more apparent by describing in detail exemplary embodiments thereof with reference to the accompanying drawings, wherein.

DETAILED DESCRIPTION

Figure 1:
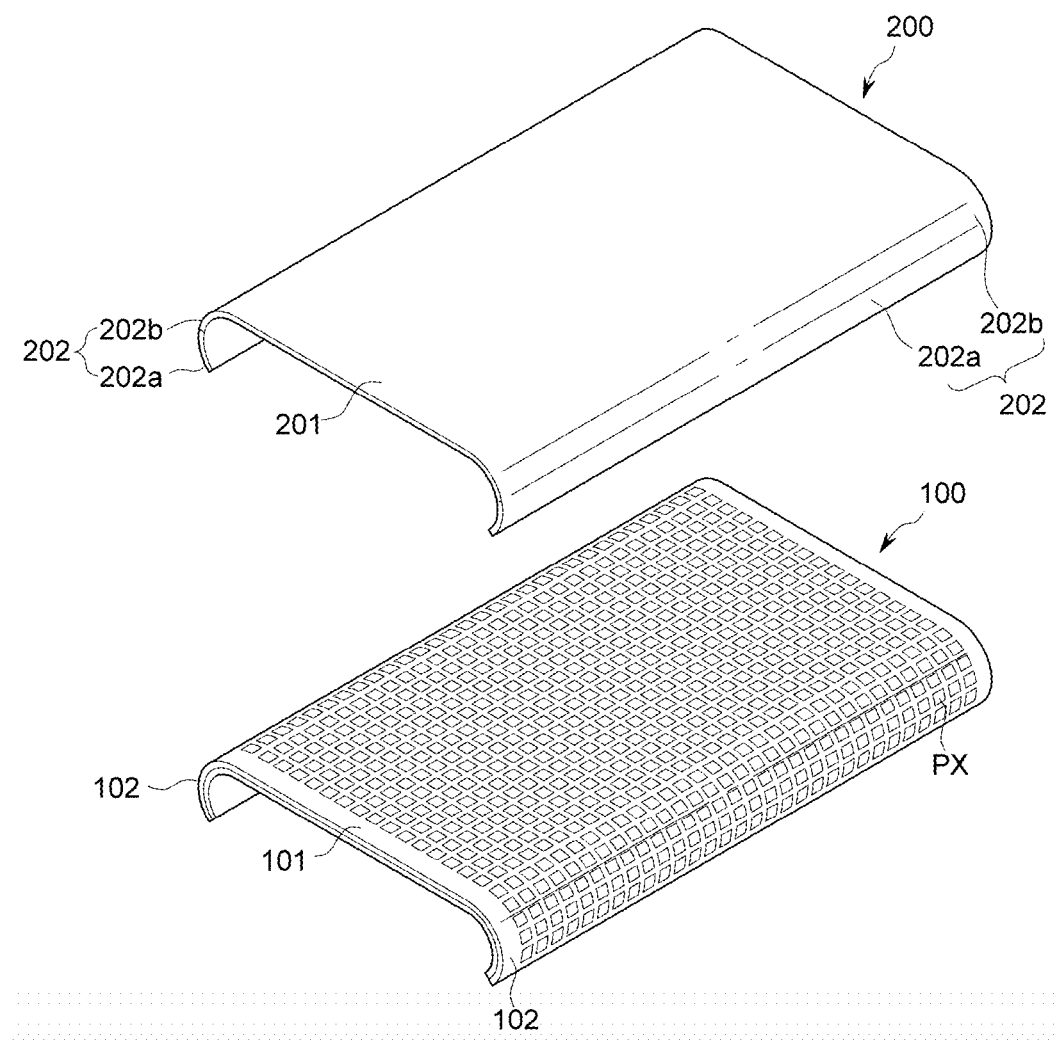
FIG. 1 is an exploded perspective view of an exemplary embodiment of display device which is bent.

The advantages and features of the invention and methods for achieving them will become apparent from exemplary embodiments described below in detail in conjunction with the accompanying drawings. However, the invention is not limited to the following exemplary embodiments, but may be implemented in various different forms. These exemplary embodiments are provided merely to make the disclosure of the invention complete and to fully convey the scope of the invention to a person having ordinary knowledge in the art to which the invention pertains. The invention is defined only by the scope of the attached claims. Therefore, in some exemplary embodiments, well-known process steps, component structures, and technologies will not be described in detail in order to prevent the present disclosure from being obscurely interpreted. Throughout the specification, the same reference symbols refer to the same components.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein (including technical and scientific terms) have the same meanings as commonly understood by a person skilled in the art to which this invention pertains. It will be further understood that terms, such as those defined in commonly used dictionaries, should be interpreted as having meanings which are consistent with their meanings in the context of the relevant art and should not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A window of a curved surface display device is manufactured by thermally molding glass such as by using one or more molds. Glass having an original plate shape is formed such as by molding into a curved surface-shaped product having a curvature by using the viscoelasticity of glass. The technique of bending one or two surfaces of a glass shape which do not overlap each other has been applied to mobile products since the implementation thereof is relatively free.

However, since at least three bending lines are used for the shape of a corner portion of a molded glass formed from three bending surfaces overlap one another, a corner is formed at the intersection of the three bending lines, and the shape of the corner portion is formed from on glass having an original plate shape. Accordingly, it is difficult to form a desired shape of a window using overlapping surfaces.

Additionally, when all four sides of a mobile display device are formed by bending glass having an original a plate shape such as by using molds, changes in the tensile stress of the glass are concentrated at corners, and thus it is difficult to control forming of a 3D shape. In other words, there occurs a phenomenon in the glass such as a decrease in the thickness of corners or the generation of a wrinkle, the glass drooping downward, a difference in the length of the corners, etc. and consequently the flatness of a front portion of the glass is degraded. Therefore, it is difficult to control the dimensions of the 3D shape of glass during molding from an original shape thereof.

Exemplary embodiments of a window of a display device and method of manufacturing the window according to the present disclosure will be described with reference to FIGS. 1 to 9D.

Figure 2:
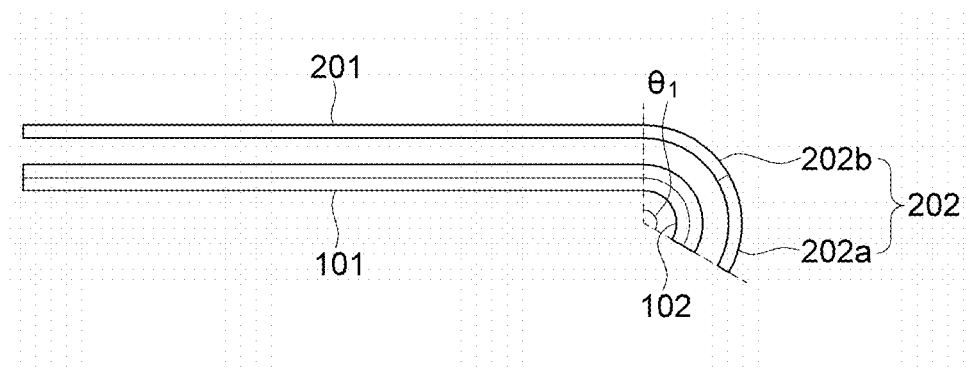
FIG. 2 is an exemplary embodiment of a cross-sectional view of the bent display device of FIG. 1.
Figure 3:
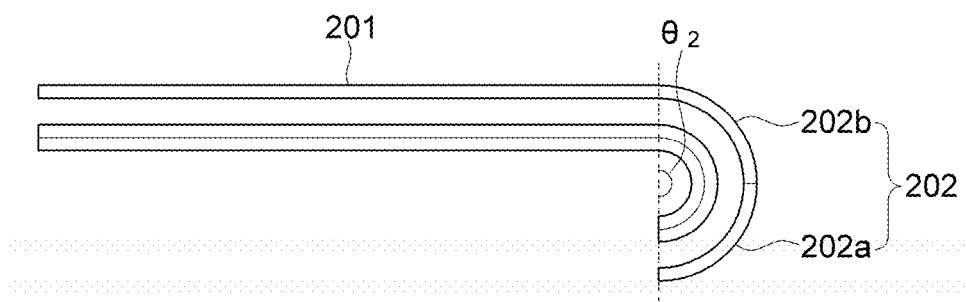
FIG. 3 is modified exemplary embodiment of a cross-sectional view of the bent display device of FIG. 1.

FIG. 1 is an exploded perspective view of an exemplary embodiment of a display device which is bent, FIG. 2 is a an exemplary embodiment of cross-sectional view of the bent display device of FIG. 1, and FIG. 3 is a modified exemplary embodiment of a cross-sectional view of the bent display device of FIG. 1.

Referring to FIGS. 1 to 3, the bent display device may include a display panel 100, and a window 200 which is disposed on the display panel 100.

According to an exemplary embodiment of the present disclosure, the display panel 100 may be a flexible display panel. Alternatively, according to an exemplary embodiment of the present disclosure, the display panel 100 may be a bent display panel having bent edges. In a method of manufacturing a bent display device, the display panel 100 may be formed to have curved edges, or may be manufactured in a flat original shape and for which non-curved edges thereof are subsequently curved such as through coupling of the display panel 100 with the window 200, a fastening frame (not shown) or the like. In other words, the display panel 100 may have substantially the same shape as the window 200 in a finally-formed bent display device.

In the following, for ease of description, the center flat portion of the display panel 100 is referred to as a flat portion 101, and curved portions along outer edges of the flat portion 101 are referred to as curved portions 102. Although the curved portions 102 of the display panel 100 are illustrated as being formed along two opposite edges of the flat portion 101, the display panel 100 is not limited thereto. In another exemplary embodiment, the curved portion 102 may be disposed or formed only along one edge of the flat portion 101. The flat portion 101 and the curved portions 102 are distinguished from each other for ease of description, but may define a single and continuous display area of the bent display device. That is, a display area at one of the flat portion 101 and a curved portion 102 may extend to define one or more of the remaining curved portions 102 and flat portion 101 of the final bent display panel 100.

The overall bent display device and components thereof are disposed in a plane defined by first and second directions crossing each other. A thickness of the overall bent display device and components thereof is disposed in a third direction crossing each of the first and second directions. In FIG. 1, a direction in which the curved portions 102 are arranged may be a first direction, while a direction in which the non-curved edges (except for the curved portions 102) are arranged may be a second direction, or vice versa. In FIGS. 2 and 3, the horizontal direction of the views may be the first and/or second directions while the vertical direction of the views may be a third (thickness) direction which crosses each of the first and second directions.

The display panel 100 may include a pixel PX provided in plurality which are used to generate and display images. The plurality of pixels PX may be disposed at the flat portion 101 and one or more of the curved portions 102 of the display panel 100, and may display images. The plurality of pixels PX may be arranged along one or more of the first to third directions of the overall bend display device. The plurality of pixels PX of the flat portion 101 may be connected to pixels PX in one or more of the curved portions 102, without being limited thereto.

The bent display device may include a display area at which an image is displayed, in each of the flat portion 101 and the curved portion 102. The bent display device may also include a non-display area at which the image is not displayed, in one or more portion among the flat portion 101 and the curved portion 102.

The display panel 100 may include a flexible film, such as a plastic film, as a base substrate or film. The display panel 100 may be implemented in such a manner that light-generating elements such as organic light-emitting diodes ("LEDs"), signal-transmitting lines and pixel-driving circuits are disposed on the base substrate as the flexible film.

The window 200 may be disposed on the display panel 100. The window 200 may form an outermost surface of the bent display device. The window 200 may form a display surface of the bent display device respectively at corresponding display areas of the display panel 100. The window 200 includes a transparent, relatively hard material, and may protect the display panel 100 from external shock to the display device while transmitting the images of the display panel 100 therethrough. Furthermore, the window 200 may include or be manufactured using a flexible film material, such as a plastic film material.

The window 200 may have curved edges as an original-formed shape or may have a flat original shape which is subsequently deformed to form the curved edges. In the following, for ease of description, the center flat portion of the window 200 is referred to as a flat portion 201, and a curved portion along one or more edges of the flat portion 201 are referred to as a curved portion 202. Each of the overall curved portions 202 may be divided into an outermost first curved portion 202a of the window 200 at a distal end thereof and a second curved portion 202b between the flat portion 201 and the first curved portion 202a.

Although the curved portions 202 of the window 200 are illustrated as being formed along two opposite edges of the flat portion 201, the window 200 is not limited thereto. In another exemplary embodiment, the curved portion 202 may be disposed or formed only along one edge of the flat portion 201. The flat portion 201, the first curved portions 202a, and the second curved portions 202b are distinguished from each other for ease of description, but may be actually a single continuous area. That is, a planar area at one of the flat portion 201 and a curved portion 202 may extend to define one or more of the remaining curved portions 202 and flat portion 201 of the final bent window 200.

Although the curved portions 202 are described on the assumption that each of the curved portions 202 has the first curved portion 202a and the second curved portion 202b, the curved portions 202 are not limited thereto. In an exemplary embodiment, each of the curved portions 202 may include two or more portions which are disposed adjacent to each other in a direction perpendicular to a bending direction, such as in a direction away from the flat portion 201.

The first curved portions 202a and the second curved portions 202b may have substantially the same curvature. More specifically, a preliminary flat portion and the first curved portions 202a may be formed by bending two opposite edge portions at distal ends thereof (e.g., areas in which the first curved portions 202a will be formed) of an original flat-shaped material for forming a window, and the flat portion 201 and the second curved portions 202b may be formed by bending two opposite edge portions (e.g., areas in which the second curved portions 202b will be formed) of the preliminary flat portion at a predetermined curvature. The method of forming the first curved portions 202a and the second curved portions 202b will be described in greater detail later.

In the window 200, the angle between the longitudinal section of the flat portion 201 and the longitudinal section of the curved portions 202 may be an obtuse angle. In an exemplary embodiment, the angle between the longitudinal section of the flat portion 201 and the longitudinal section of the curved portion 202 may range from about 120 degrees to about 180 degrees.

In FIG. 1, each of the flat portions 101 and 201 and each of the curved portions 102, 202a and 202b have relatively long edges and relatively short edges. Throughout the specification, the longitudinal section of the flat portion 201 refers to a relatively long edge or interface respectively between the flat portion 201 and each of the curved portions 202, and the longitudinal section of the curved portions 202 refers to the relatively long edge or outermost edge surface of the window 200 at a distal end thereof. Longitudinal sections may be similarly defined for the display panel 100, without being limited thereto.

Referring to FIG. 2, within an exemplary embodiment of the window 200, the first angle θ1 formed by the longitudinal section of the flat portion 201 (vertical dotted line) and the longitudinal section of the curved portions 202 (inclined dotted line) may be about 120 degrees. Referring to FIG. 3, within a modified exemplary embodiment of the window 200, the second angle θ2 formed by the longitudinal section of the flat portion 201 (upper portion of vertical dotted line) and the longitudinal section of the curved portion 202 (lower portion of the vertical dotted line) may be about 180 degrees.

The cross-sectional shape of the curved portions 202 may have a shape as a portion of a circle or portion of an ellipse.

The angle formed by the flat portion 201 and the curved portions 202 (e.g., as taken from a distal end of the window 200), may be the sum of the angle at which the first curved portion 202a is curved relative to a virtual line at the interface of the first and second curved portions 202a and 202b and the angle at which the second curved portion 202b is curved relative to the longitudinal section of the flat portion 201. The first curved portion 202a may be curved at an angle ranging from about 45 to about 90 degrees with respect to the virtual line at the interface of the first and second curved portions 202a and 202b, and the second curved portion 202b may be curved at an angle ranging from 45 to 90 degrees relative to the longitudinal section of the flat portion 201.

The window 200 may have substantially the same shape as the display panel 100. In an exemplary embodiment, for example, when the display panel 100 has the flat portion 101 and the curved portions 102 which are respectively (lengthwise) extended along the relatively long edges of the flat portion 101, the window 200 may have the flat portion 201 and the curved portions 202 respectively corresponding to the flat portion 101 and curved portions 102 of the display panel 100. However, the display device is not limited thereto. In an exemplary embodiment, even when the window 200 includes the flat portion 201 and the curved portions 202, the display panel 100 may include only the flat portion 101. Where the display panel 100 includes only the flat portion 101, the window 200 includes a one-side curved portion 202 or two-side curved portions 202 formed with reference to a single bending line does not intersect another bending line.

Figures 1, 4A:
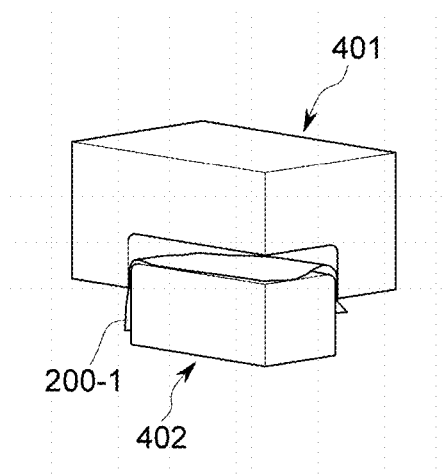
FIG. 4A_1 through 4A_4 are perspective views showing processes in an exemplary embodiment of a method of molding a window by using two molds.
Figures 2, 4A:
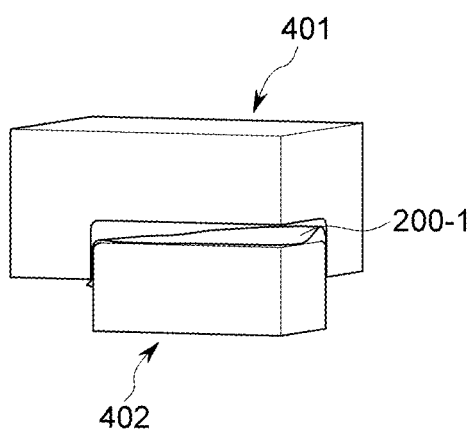
Figures 3, 4A:
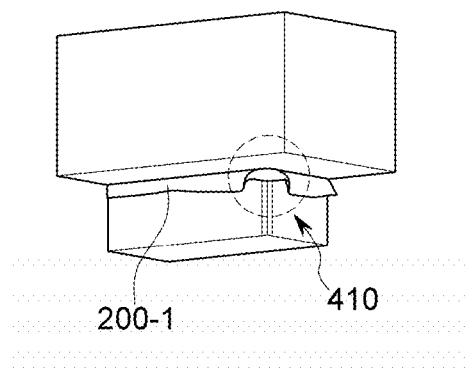
Figures 4, 4A:
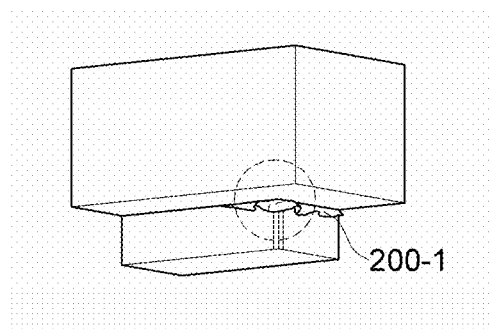

FIG. 4A_1 through 4A_4 are perspective views showing processes in a method of molding a window by using two molds.

The thermal molding of glass for a display device may be performed using molds, e.g., an upper mold 401 and a lower mold 402. Additionally, an intermediate mold (not shown) may be employed. The upper mold 401 collectively includes four or more partial molds, and the lower mold 402 also collectively includes four or more partial molds. FIGS. 4A_1 through 4A_4 label a single partial mold as 401 and 402 for convenience of explanation.

When the concentration of stress occurs due to the intersection of two or more bending lines or a bending radius is relatively small, at least two molds (upper and lower molds) are used. In a method of pressing glass, a preliminary glass form is heated to a transition point temperature or higher, and pressed between molds. The glass heated to a transition point temperature or higher can be relatively easily molded or shaped.

In the conventional case of a single mold technique in which only one mold is used to deform a preliminary glass form, an internal space of the mold is a vacuum or may form a vacuum. As a bending radius of a finally-formed bent window decreases, a force applied to the preliminary glass becomes higher to form the decreased bending radius. Accordingly, applying the single mold technique to the molding of glass may be difficult.

Referring to FIGS. 4A_1 and 4A_2, in one or more exemplary embodiment of a molding technique using at least two molds, a preliminary glass material 200_1 is disposed between the upper and lower molds 401 and 402. The preliminary glass material 200_1 is disposed to have portions extending further than a flat (upper) portion of the lower mold 402 at two adjacent side surfaces thereof, e.g., at a corner thereof (not visible in FIGS. 4A_1 and 4A_2, but visible in FIGS. 4A_3 and 4A_4). The further-extended portions of the preliminary glass material 200_1 form a corner portion of a window.

A distance between the upper and lower molds 401 and 402 is decreased (FIG. 4A_1 to FIG. 4A_4) where a portion of the lower mold 402 inserted into a cavity of the upper mold 401 is respectively increased. As the upper and lower molds are pressed together, interference of the further-extended portions of the preliminary glass material 200_1 with a mold occurs at corner portions 410 (dotted circle) where a plurality of bends occur in the preliminary glass material 200_1, and the lengths of the corner portions of the preliminary glass material 200_1 increase when the upper mold 401 and the lower mold 402 are pressed against each other (FIG. 4A_3 to 4A_4). The lengths may be taken with respect to a distance from the flat portion of the lower mold 402. Accordingly, implementing a window for a display device in which all four edge portions thereof are curved to have a desired length and/or uniformity of length a may be difficult.

When the length of the curved portions of the window taken from the flat portion thereof is relatively small, molding of a preliminary glass material is relatively easy. However, the corner portions of the preliminary glass material are subjected to three-direction bending since three bending lines meet one another at each corner of the window formed from the preliminary glass material.

When a preliminary glass material having a plate shape is molded into a 3D object having a curvature, portions of the glass material at the corner portions thereof overlap each other (dotted circles in FIGS. 4A_3 and 4A_4). Furthermore, when a curvature occurs in the plate-shaped preliminary glass material, rectilinear portions are reduced and the degree of difficulty regarding bending is increased, and thus molding of such plate-shaped preliminary glass material may be difficult.

Figure 4B:
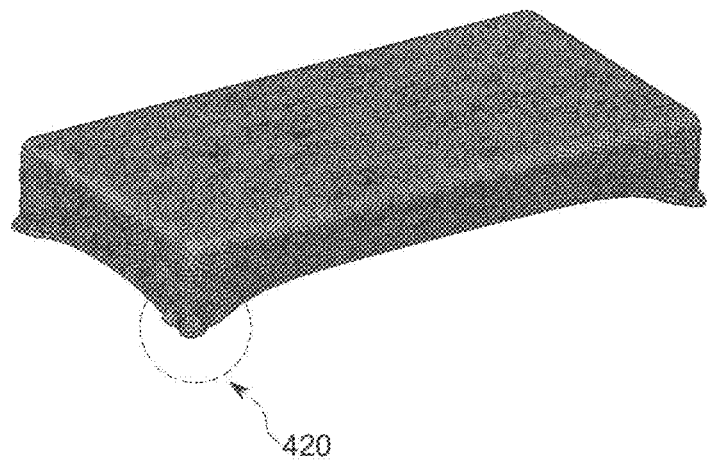
FIG. 4B is a perspective view showing a window molded using the method of molding a window, which is shown in FIG. 4A_1 through 4A_4.

FIG. 4B is a view showing a window molded using the method of molding a window, which is shown in FIGS. 4A_1 through 4A_4.

Edge portions of a preliminary glass material overlap at locations which form the corner portions of the window, and thus the glass material extends at the corner portions 420 of the window formed using the method of molding a window, which is shown in FIGS. 4A_1 through 4A_4.

Figure 5A:
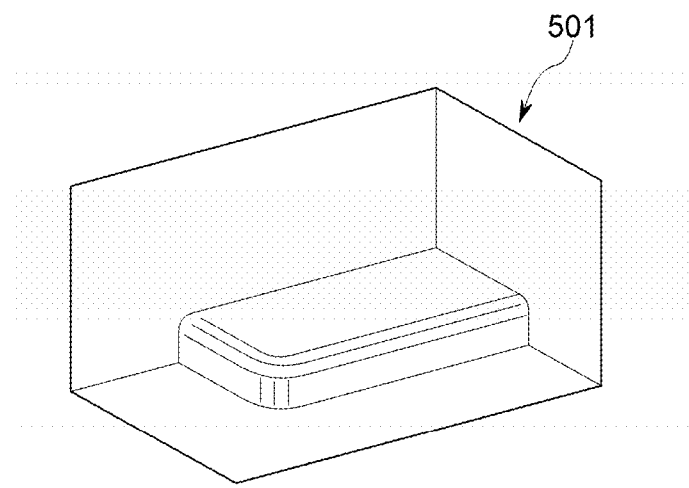
FIGS. 5A and 5B are perspective views showing shapes of a mold which is used to mold glass.
Figure 5B:
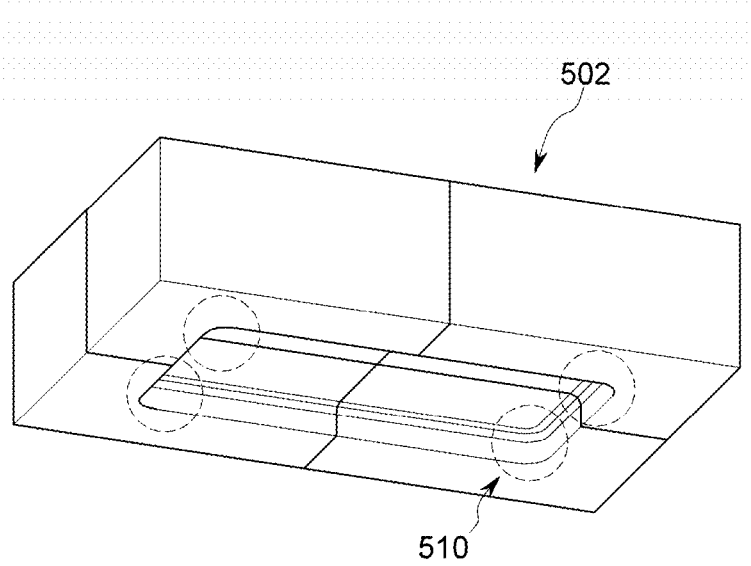

FIGS. 5A and 5B are perspective views showing shapes of a mold which is used to mold glass.

FIG. 5A shows the shape of a partial upper mold 501 as one quarter of an overall upper mold which is used to mold glass, and FIG. 5B shows the overall shape of a collective upper mold 502 defined by a collection of partial upper molds 501. When this collectively upper mold is employed, side surfaces and corner portions of a preliminary glass material are simultaneously molded. Accordingly, problems arise in that portions of a preliminary glass material overlap at the corner portions 510 (dotted line circles). With the overlapping portion of the preliminary glass material, wrinkles are generated and the corner portions are extended (FIG. 4B, as an example). Furthermore, an additional problem arises in that a shape or profile at a lower end or edge of the molded preliminary glass material is not controlled (e.g., uneven or non-uniform in length (FIG. 4B, as an example).

Figure 5C:
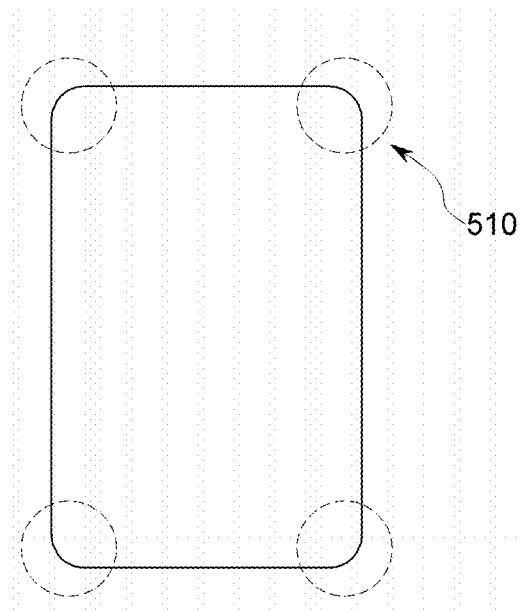
FIG. 5C is a top plan view showing an exemplary embodiment of corner portions of a window.

FIG. 5C is a top plan view showing a profile of the corner portions 510 (dotted line circles) of a window formed from a preliminary glass material. The corner portions 510 of the window in FIG. 5C correspond to the corner portions 510 of the upper mold 502 in FIG. 5B.

Figure 6A:
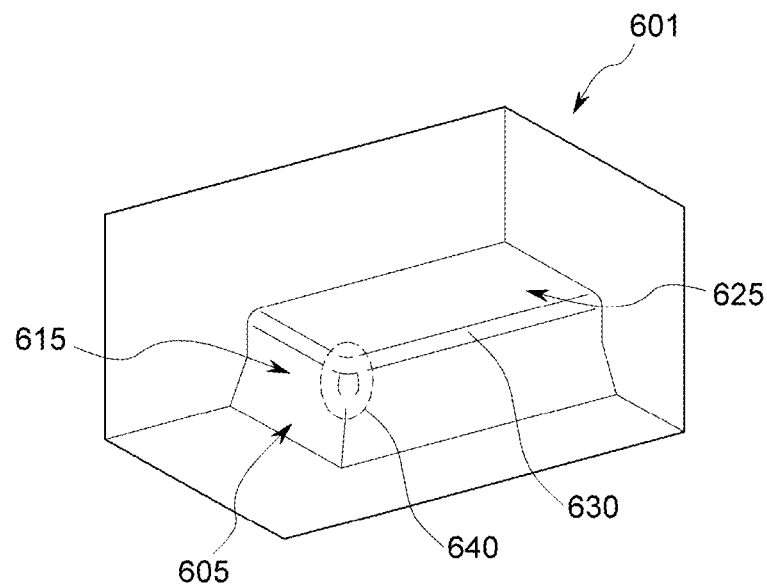
FIG. 6A is a perspective view showing an exemplary embodiment of a partial upper mold which is used to mold glass according to the invention.

FIG. 6A is a perspective view showing an exemplary embodiment of a partial upper mold which is used to mold glass according to the invention. The partial upper mold of FIG. 6A may be used in a molding process as generally described in FIGS. 4A_1 through 4A_4, in which a lower mold having a preliminary glass material disposed thereon is engaged with the upper mold to deform and curve the preliminary glass material according to a profile of the upper mold.

In an exemplary embodiment, the partial upper mold 601 is a mold corresponding to one quarter of an overall upper mold. In an exemplary embodiment, the partial upper mold 601 is formed by engraving a depression into a preliminary partial mold, and the depression includes two stepped portions, e.g., an upper stepped portion and a lower stepped portion. Furthermore, the depression may include two or more stepped portions.

The partial upper mold 601 includes a window side surface bending portion 605, a window corner bending portion 615, and a window upper flat portion 625 corresponding to the flat portion of a window. The window upper flat portion 625 comes into contact with a portion of a preliminary glass material which will form the flat portion of the window. The window side surface bending portion 605 is located beneath the window corner bending portion 615 along a thickness direction (vertical in FIG. 6A) of the partial upper mold 601.

Side surfaces of a window formed from a preliminary glass material are primarily molded using the window side surface bending portion 605 at a lower position of the partial upper mold 601, and a corner portion of the window is secondarily molded using the window corner bending portion 615 at a lower position of the partial upper mold 601 after the completion of the side surfaces at the window side surface bending portion 605.

The depression of the partial upper mold 601 may extend from a lower surface thereof toward an upper surface thereof, terminating at the window upper flat portion 625. The lower surface of the partial upper mold 601 may be disposed in a single plane. The upper flat portion 625 may be disposed in a plane parallel to that of the lower surface of the partial upper mold 601, without being limited thereto.

The window side surface bending portion 605 is inclined with respect to the lower surface of the partial upper mold 601. The inclined window side surface bending portion 605 may define a largest planar area of the depression at the lower surface of the partial upper mold 601. Thus, the inclined window side surface bending portion 605 facilitates the molding of a glass material heated to a transition point temperature or higher and attachment onto a lower mold.

The window corner bending portion 615 may be defined as a portion of the partial upper mold 601 between the window upper flat portion 625 and the window side surface bending portion 605. A maximum planar area of the depression at the window corner bending portion 615 is smaller than a minimum planar area defined by the inclined window side surface bending portion 605. The window corner bending portion 615 of the partial upper mold 601 molds a preliminary material surface in contact therewith after being molded at the window side surface bending portion 605 into a curved surface by further bending the non-curved surface. The window corner bending portion of a window mold according to one or more exemplary embodiments may mold a corner portion of the preliminary material, where one to three bending lines meet one another, into a curved surface.

The generation of a wrinkle and the excessive extension of a lower portion of the curved surfaces of a window due to overlapping of edge portions of a preliminary glass material at corner portions thereof may be reduced or effectively prevented by performing stepwise molding, such as by using in order, the window side surface bending portion and window corner bending portion of the depression.

Figure 6B:
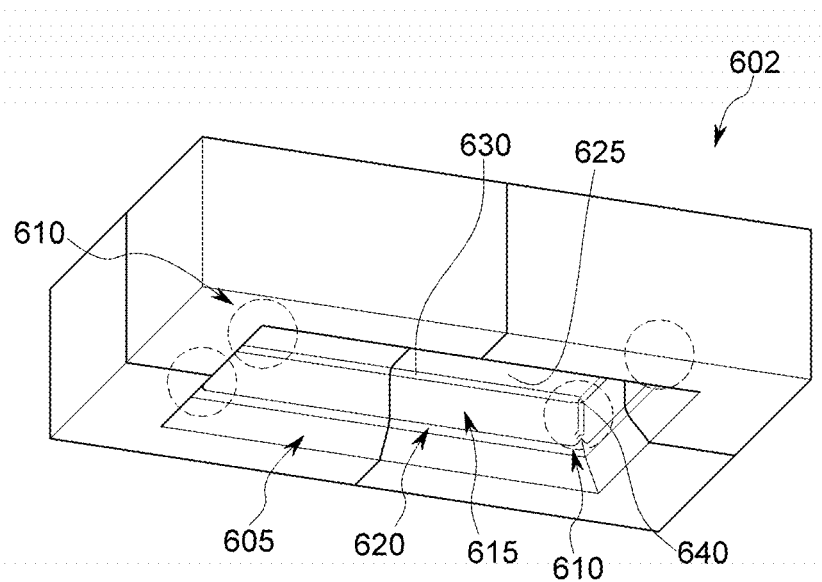
FIG. 6B is a perspective view showing an exemplary embodiment of a mold which is used to mold glass according to the invention.
Figure 6C:
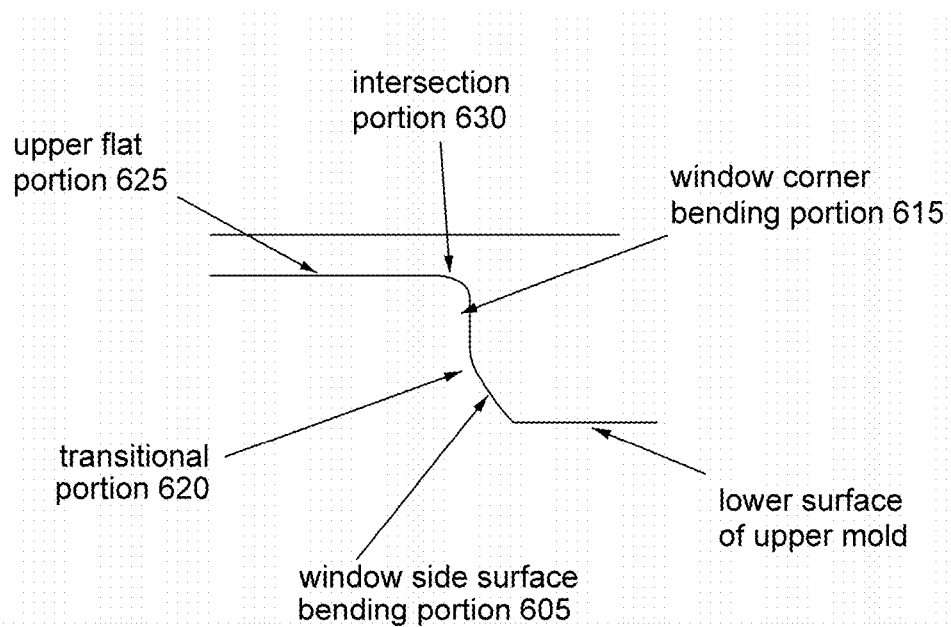
FIG. 6C is a cross-sectional view of the partial upper mold of FIG. 6A.

FIG. 6B is a perspective view showing an exemplary embodiment of an upper mold which is used to mold glass according to the invention. FIG. 6C is a cross-sectional view of the partial upper mold of FIG. 6A.

The upper mold of FIGS. 6A through 6C may be used in a molding process as generally described in FIGS. 4A_1 through 4A_4, in which a lower mold having a preliminary glass material disposed thereon is engaged with the upper mold to deform and curve the preliminary glass material according to a profile of the upper mold.

An upper mold 602 collectively includes four partial molds (601 in FIG. 6A). Depressions of the individual partial molds 601 are arranged to form a single one depression of the upper mold 602 at which a preliminary glass material will be curved. Each of the partial molds includes a window side surface bending portion 605, a window corner bending portion 615, and a window upper flat portion 625 configured to come into contact with a portion of a preliminary glass material corresponding to the flat portion of a finally-formed window. The window corner bending portion 615 includes an intersection portion 630 at which the window corner bending portion 615 transitions to the window upper flat portion 625 and a corner formation portion 640 at which two adjacent sides of the window corner bending portion 615 meet two adjacent sides of the intersection portion 630. Within the upper mold 602, surfaces of the window side surface bending portion 605, the transitional portion 620, the window corner bending portion 615, the intersection portion 630 and the window upper flat portion 625 are coplanar with each other to form continuous surfaces defining a single one molding cavity of the upper mold 602.

Any one or both of the intersection portion 630 and the corner formation portion 640 may be defined for the partial upper mold 601 depending on the shape of a finally-formed glass. In an exemplary embodiment, where a window has a four-sided shape in a top plan view such as the two longer sides and the two shorter sides in FIG. 5C, the window may have upper, lower, left, right side surfaces and curved side surfaces at each of the four sides. The upper, lower, left, and right side surfaces of the window are formed from corresponding upper, lower, left, and right side edge portions of a preliminary glass molded via the window side surface bending portion 605. The preliminary glass material heated to a transition point temperature or higher is pressed onto the window side surface bending portion 605 of the partial upper mold 601 to be curved thereby.

A transitional portion 620 of the partial upper mold 601 is an area at which the window side surface bending portion 605 transitions to the window corner bending portion 615. The transitional portion 620 is disposed above the window side surface bending portion 605 in a direction toward the window upper flat portion 625. The transitional portion 620 facilitates the bending of side surfaces of the preliminary glass material, promotes entry onto the window corner bending portion 615 from the window side surface bending portion 605, and is bent at a predetermined angle different from that of the window side surface bending portion 605. A planar area or cross-sectional dimension of the depression at the transitional portion may be between that at the window side surface bending portion 605 and a remainder of the window corner bending portion 615. That is, a planar area or cross-sectional dimension of the depression may decrease from a lower surface of the upper mold 602 toward the upper flat portion 625.

When a thermal molding target glass material is applied into the depression and onto the window side surface bending portion 605 such as from outside the upper mold 602, the side surfaces at end portions of the target glass material are bent according to the inclined angle of the window side surface bending portion 605. Since the molding of the side surfaces is completed on the side surfaces of the window side surface bending portion, the concentration of the target glass material onto the corner portions is eliminated. The molding of the side surfaces except for the corner portions is performed by the window side surface bending portions 605 of the four partial upper molds 601. Thus, the upper, lower, left and right side surfaces and the corner portions of a window are simultaneously molded by the collective upper mold 602, thereby reducing or effectively preventing a wrinkle from being generated on the corner portions and also reducing or effectively preventing the length of the side surfaces of the window from being changed from an original length thereof.

When the molding of the upper, lower, left and right side surfaces of the thermal molding target glass material is finished on the window side surface bending portion 605, the thermal molding target glass material is transitioned within the upper mold 602 to the window corner bending portion 615 by passing over the transitional portion 620.

When the molded thermal target glass is raised within the depression from the window side surface bending portion 605 to the window corner bending portion 615, ends of the molded thermal target glass is disposed above the transitional portion 620 such that the transitional portion 620 below the raised glass does not overlap the ends thereof.

The transitional portion 620 has a slope steeper than that of the window side surface bending portion 605 relative to the lower surface of the upper mold 602, facilities the entry of the upper, lower, left and right side surfaces, previously molded on the window side surface bending portion 605, onto the window corner bending portion 615, and enables the upper, lower, left and right side surfaces to be securely fastened along surfaces of the upper mold 602.

Furthermore, the transitional portion 620 reduces or effectively prevents glass having entered onto the window corner bending portion 615 from flowing downward.

The width (e.g., overall planar area) of the previously molded glass having entered onto the window corner bending portion 615 is decreased since the planar area or cross-sectional dimension of the depression at the window corner bending portion 615 is smaller than that of each of the transitional portion 620 and the window side surface bending portion 605. With the decreased size of the previously molded glass having entered onto the window corner bending portion 615, the upper, lower, left and right side surfaces at ends of the previously molded glass are brought into tight contact with each other, and an obtuse angle of the previously molded glass formed on the window side surface bending portion 605 is changed vertically to be inclined at an angle less than the first obtuse angle.

The previously molded glass is pressed by the window corner bending portion 615 and the upper flat portion 625 after the window side surfaces have been molded by the window side surface bending portion 605, thereby being molded into the corners and upper portion of the finally-formed window.

The intersection portion 630 where upper flat portion 625 and window corner bending portions 615 surfaces intersect one another inside the mold has a predetermined curvature and a predetermined thickness so that a portion of a finally-formed window where flat portion and curved portion surfaces intersect one another have the predetermined curvature and the predetermined thickness corresponding to those of the upper mold 602.

Furthermore, at corners 610 of the upper mold 602, the corner formation portion 640 forms corners of the finally-formed window at an area which three surfaces of the target glass material are brought into contact with one another by bending end portions thereof along three bending lines.

The corner formation portion 640 may have a curvature and a thickness identical to or different from those of the intersection portion 630.

The side surfaces of the glass material raised from the window side surface bending portion 605 are made vertical (e.g., substantially perpendicular to the lower surface of the upper mold 602) by the window corner bending portion 615, and are brought into contact with each other within the upper mold 602 with the window corner bending portion 615 thereof.

Since the upper, lower, left and right side surfaces of a finally-formed window are all formed at the window side surface bending portion 605, only the corners are formed on the window corner bending portion 615. The target glass material to be deformed on the window side surface bending portion 605 enters onto the window corner bending portion 615 in the state of being spread at a predetermined angle, and thus the concentration of tensile stress onto the corners is reduced, thereby reducing a decrease in the thickness of corner portions and the generation of wrinkles. Furthermore, differences in height or thickness of the curved portions of the finally-formed window may be eliminated at the portions thereof except for the corners and the corner portions.

According to the prior art, an extension phenomenon occurs at each corner portion, and thus the work of reducing a length such as by shaving of the surfaces of the corner portions is required to eliminate differences in height. In contrast, one or more exemplary embodiment of forming a window and a mold used therefor obviates the separate work of shaving surfaces or lengths.

Figure 7A:
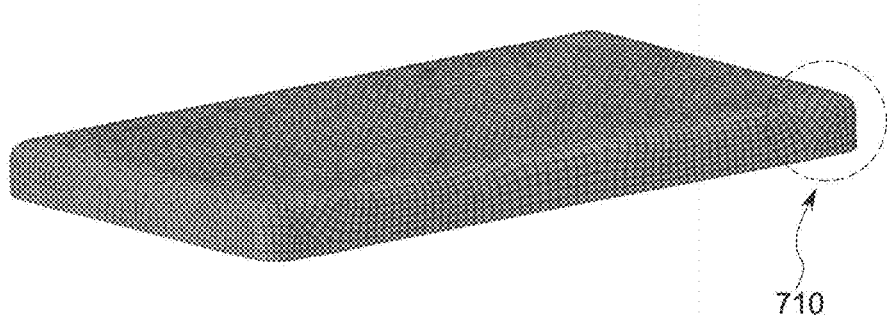
FIGS. 7A and 7B are perspective and top plan views showing an exemplary embodiment of a window molded using a method of molding a window according to the invention.
Figure 7B:
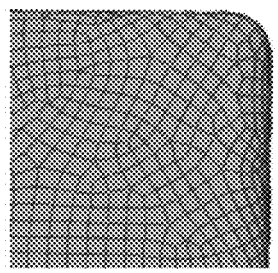

FIGS. 7A and 7B are perspective and top plan views showing an exemplary embodiment of a window molded using a method of molding a window according to the invention. Referring to FIG. 7A, it can be seen that the method of molding a window according to one or more exemplary embodiment of the invention does not generate a decrease in the thickness, a wrinkle, an increase in the difference in length, etc. at corner portions 710 of the window.

Referring to FIG. 7B, it can be seen that when the method of molding a window according to one or more exemplary embodiment of the invention, the generation of a wrinkle and an increase in the difference in length of the curved side surface of the window in a direction away from the flat portion thereof may be reduced or prevented at the corner portions of the finally formed window.

Figure 8:
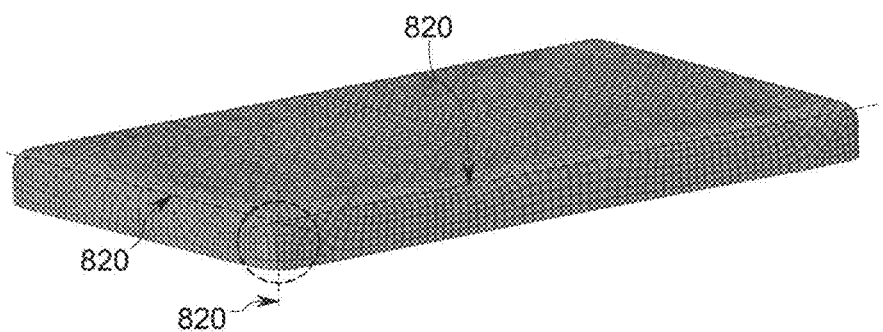
FIG. 8 is a perspective view showing an exemplary embodiment of bending lines which intersect one another at a corner portion of a window molded using a method of molding a window.

FIG. 8 is a perspective view showing a bending line 820 provided in plurality and intersecting one another at a corner portion of a finally-formed window. The bending lines 820 intersect one another at the corner portion of the finally-formed window. Three bending lines intersect one another at the corner portion of the finally-formed window. In an exemplary embodiment, the three bending lines 820 respectively lengthwise extend along the first, second and third directions.

FIGS. 9A to 9D respectively show exemplary embodiments of a multi-surface corner glass window molded using the method according to the invention.

Figure 9A:
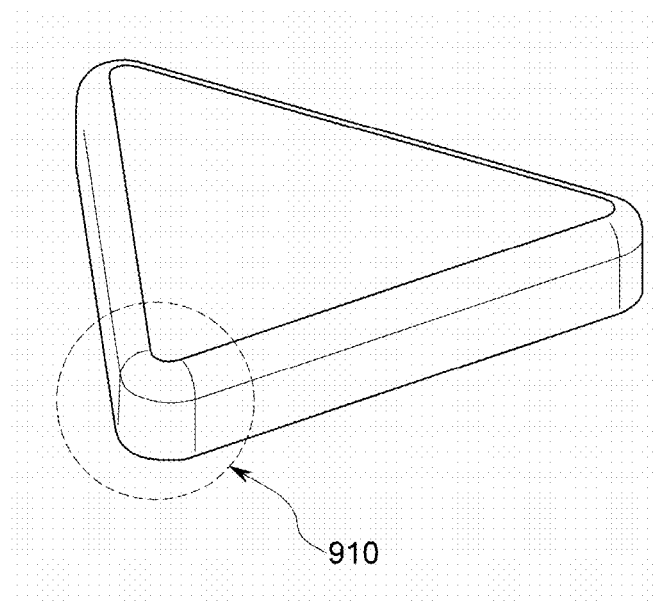
FIGS. 9A to 9D respectively show exemplary embodiments of multi-surface corner glass windows molded using a method of molding a window according to the invention.
Figure 9B:
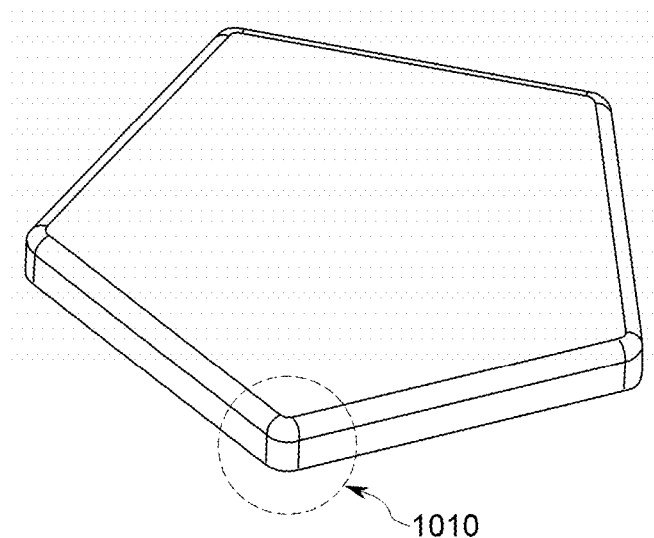

Referring to FIGS. 9A and 9B, triangular and pentagonal glass windows may include corner portions 910 and 1010. In one or more exemplary embodiment of a method of forming a window and an upper mold used therefore, the corner portions 910 and 1010 may be freely formed, such as from a rectilinear preliminary glass window.

Figure 9C:
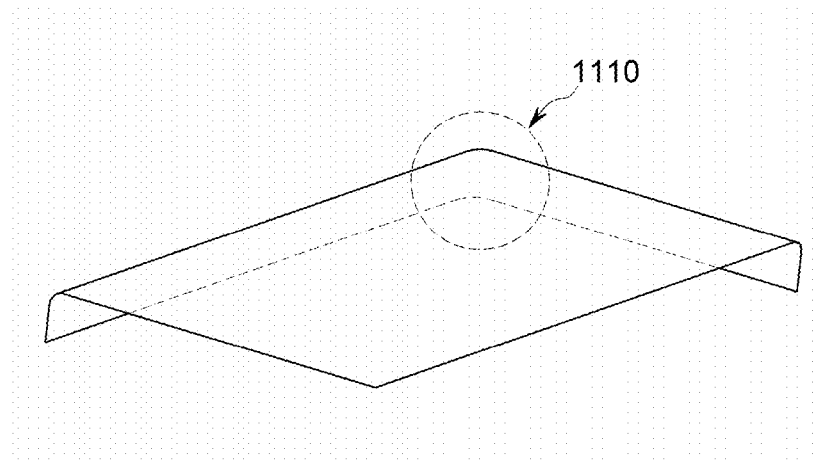

FIG. 9C shows a curved corner which is formed at a portion 1110 where two side surfaces at two adjacent sides of a flat portion intersect each other, while side surfaces are absent at remaining sides of the flat portion.

Figure 9D:
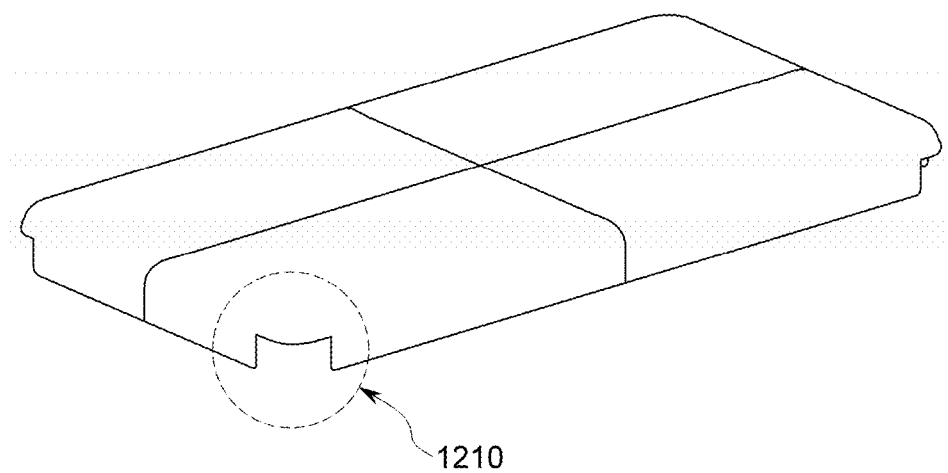

FIG. 9D is a view showing a corner portion molded to include a recess in the side surface extended from a flat portion.

Referring to FIG. 9D, a window may be molded such that an empty space is formed recessed from an end edge of the window at a window corner 1210. The space may not be recessed from the end edge to a flat portion and an upper portion of the side surface at the window corner 1210 may remain to have a predetermined length from the flat portion.

In this case, the predetermined length of the window at the window corner 1210 may be about 1 millimeter (mm) or more taken from a side edge of the flat portion toward the end edge of the window.

The above-described method of implementing a multi-surface 3D display device according to one or more exemplary embodiment of the invention is used to mold a glass window capable of covering and protecting five surfaces of a display device, including a front (display) surface and side surfaces extended curved therefrom including at corners of the display device, by using a preliminary glass having a plate shape.

Furthermore, there may be implemented a display device having a four-side edge display in which glass corner portions are present at corners of the display device and the degree of completion of design is high.

One or more exemplary embodiment of the method of molding a window for a display device to have curved side surfaces extended from a display surface according to the present disclosure is capable of forming curved corners without elongating or thinning, wrinkling or cracking the preliminary glass material.

A phenomenon in which the corner portions are lengthwise extended does not occur, and thus an additional process for trimming the extra length is obviated.

Although the exemplary embodiments of the present disclosure have been described with reference to the accompanying drawings, it will be understood by those having ordinary knowledge in the art to which the invention pertains that the invention may be practiced in other specific forms without departing from the technical spirit and essential features of the invention. Therefore, the above-described exemplary embodiments should be understood as being illustrative, not limitative, in all features.

What is claimed is:

1. A mold for molding a window for a display device, the mold comprising:
   a lower surface; and
   a depression extended from the lower surface and defined in order from the lower surface by:
      a window side surface bending portion extended directly from the lower surface and corresponding to each of adjacent side surfaces of the display device which are extended from an edge of a flat display portion thereof;
      a window corner bending portion extended inclined from the window side surface bending portion and corresponding to each of the adjacent side surfaces of the display device and a corner of the display device which is extended from a corner of the flat display portion and at which the adjacent side surfaces meet each other, and
      a flat portion corresponding to the flat display portion of the display device, wherein with respect to the lower surface of the mold:
         the window side surface bending portion is inclined at a first angle which is an obtuse angle, and
         the window corner bending portion is inclined at a second angle smaller than the first angle.

2. The mold of claim 1, wherein the window side surface bending portion presses an end portion of a preliminary window material which is flat, to provide an inclined end portion of the preliminary window material which is inclined at the first angle relative to the lower surface of the mold.

3. The mold of claim 2, wherein contact of the inclined end portion of the preliminary window material which is inclined at the first angle, along the window corner bending portion, bends the inclined end portion to provide a curved corner of the window which is curved at the second angle and corresponds the corner of the display device.

4. The mold of claim 1, wherein the mold comprises a plurality of partial molds each including the flat portion, the window side surface bending portion and the window corner bending portion.

5. The mold of claim 1, wherein
   the depression of the mold presses a flat preliminary window material to form a curved side surface of the window portion corresponding to the adjacent side surfaces of the display device, and
   a cross-sectional width of the depression at the window corner bending portion is smaller than that at the window side surface bending portion.

6. The mold of claim 5, wherein a largest cross-sectional width of the depression is defined at the window side surface bending portion.

7. The mold of claim 1, wherein
   the mold comprises a plurality of partial molds assembled with each other,
   each of the plurality of partial molds includes the flat portion, the window side surface bending portion and the window corner bending portion, and
   the depression of the mold presses a preliminary window glass heated to a transition point temperature or higher, to form a curved side surface of the window which corresponds to the adjacent side surfaces of the display device.

8. The mold of claim 1, wherein
   the window side surface bending portion comprises two inclined surfaces which meet each other at a corner of the window side surface bending portion and along which two end portions of a preliminary window material which meet each other at a corner of the preliminary window material are respectively pressed to each be inclined at the first angle relative to the lower surface of the mold, and
   contact of the two inclined end portions of the preliminary window material along the window corner bending portion which is between the flat portion and the window side surface bending portion, bends each of the inclined end portions to form a corner of the window corresponding to the corner of the display device, the corner of the window being curved at the second angle relative to the lower surface of the mold.

9. A mold for molding a window for a display device, the mold comprising:
   at least one mold of an upper mold and a lower mold to which a preliminary window material is pressed to define curved side surfaces of the window,
   wherein the at least one mold comprises:
      a lower surface; and
      a depression extended from the lower surface and defined in order from the lower surface by:
         a window side surface bending portion extended directly from the lower surface and corresponding to each of adjacent side surfaces of the display device which are extended from an edge of a flat display portion thereof;
         a window corner bending portion extended inclined from the window side surface bending portion and corresponding to each of the adjacent side surfaces of the display device and a corner of the display device which is extended from a corner of the flat display portion and at which the adjacent side surfaces meet each other; and
         a flat portion corresponding to the flat display portion of the display device,
      wherein with respect to the lower surface of the mold:
         the window side surface bending portion is inclined at a first angle which is an obtuse angle, and
         the window corner bending portion is inclined at a second angle smaller than the first angle.

10. The mold of claim 9, wherein the window side surface bending portion presses an end portion of a preliminary window material which is flat, to provide an inclined end portion of the preliminary window material which is inclined at the first angle relative to the lower surface of the mold.

11. The mold of claim 10, wherein contact of the inclined end portion of the preliminary window material which is inclined at the first angle, along the window corner bending portion, bends the inclined end portion to provide a curved corner of the window which is curved at the second angle and corresponds t the corner of the display device.

12. The mold of claim 9, wherein the mold comprises a plurality of partial molds each including the flat portion, the window side surface bending portion and the window corner bending portion.

* * * * *